(12) United States Patent
Langford, Jr.

(10) Patent No.: US 8,777,299 B2
(45) Date of Patent: Jul. 15, 2014

(54) 3 STAGE HOOD ROOF

(71) Applicant: Isaac Langford, Jr., Dolton, IL (US)

(72) Inventor: Isaac Langford, Jr., Dolton, IL (US)

(*) Notice: Subject to any disclaimer, the term of this patent is extended or adjusted under 35 U.S.C. 154(b) by 0 days.

(21) Appl. No.: 13/875,897

(22) Filed: May 2, 2013

(65) Prior Publication Data

US 2014/0001793 A1    Jan. 2, 2014

Related U.S. Application Data

(60) Provisional application No. 61/687,808, filed on May 2, 2012.

(51) Int. Cl.
 *B62D 25/10* (2006.01)
(52) U.S. Cl.
 USPC ............... 296/193.11; 180/69.2; 180/69.24
(58) Field of Classification Search
 CPC ........................... B62D 25/10; B62D 25/105
 USPC ........... 296/193.11, 146.16; 180/69.2, 69.21, 180/69.24
 See application file for complete search history.

(56) References Cited

U.S. PATENT DOCUMENTS

| | | | | | |
|---|---|---|---|---|---|
| 2,410,734 | A | * | 11/1946 | Hitzelberger | ............... 180/69.2 |
| 3,694,846 | A | * | 10/1972 | Parker | ........................ 15/250.16 |
| 4,153,291 | A | * | 5/1979 | Conti et al. | .................. 180/69.2 |
| 4,658,925 | A | * | 4/1987 | Hirosawa et al. | ............ 180/68.1 |
| 4,695,090 | A | | 9/1987 | Draper | |
| 4,995,665 | A | | 2/1991 | Ichinose et al. | |
| 5,275,249 | A | * | 1/1994 | Nelson | ......................... 180/69.2 |
| 6,311,796 | B1 | * | 11/2001 | Mayer | ........................ 180/69.2 |
| 6,626,256 | B2 | * | 9/2003 | Dennison et al. | ........... 180/69.24 |
| 6,634,449 | B2 | * | 10/2003 | Randolph | .................. 180/69.24 |
| 6,857,495 | B2 | * | 2/2005 | Sawa | ......................... 180/274 |
| 7,314,246 | B2 | | 1/2008 | MacNee, III et al. | |
| 7,677,631 | B1 | * | 3/2010 | Zischke et al. | ............. 296/97.22 |
| 7,862,107 | B2 | * | 1/2011 | Oba et al. | ................. 296/193.11 |
| 2001/0027884 | A1 | * | 10/2001 | Dennison et al. | ............ 180/69.2 |
| 2012/0280537 | A1 | * | 11/2012 | Quirk | ........................ 296/193.11 |
| 2012/0292122 | A1 | * | 11/2012 | Verbrugge | .................... 180/68.4 |
| 2014/0001793 | A1 | * | 1/2014 | Langford, Jr. | ............ 296/193.11 |

FOREIGN PATENT DOCUMENTS

JP    2006-168631    *   6/2006    ............. B62D 25/10

* cited by examiner

*Primary Examiner* — Glenn Dayoan
*Assistant Examiner* — Gregory Blankenship
(74) *Attorney, Agent, or Firm* — Ruth Eure

(57) ABSTRACT

The invention provides an automated sunroof or hoodroof installed onto the hood of a vehicle. The 3 Stage Hood Roof is centrally positioned on a vehicle's hood and is connected to an internal motor that operates with a push button mechanism located within the car. Pressing the push button engages the motor to multiple positions. In the first position, the hoodroof rotates slightly from its front attachment to the hood of the vehicle and tilts upward toward the rear. The second position retracts the roof completely or partially. The third position lowers the roof so that the roof is recessed from the hood of the vehicle. The fourth stage is a closed position, covering the entire engine.

5 Claims, 2 Drawing Sheets

TILTS UPWARD WITH THE TOUCH OF A BUTTON

3 STAGE HOOD ROOF

CLAIM OF PRIORITY

This patent application claims priority under 35 USC 119 (e) (1) from U.S. Provisional Patent Application Ser. No. 61/687,808 filed Mar. 2, 2012, of common inventorship herewith entitled, "3 Stage Hood Roof."

FIELD OF THE INVENTION

The present invention pertains to the field of vehicle accessories, and more specifically to the field of vehicle sunroofs for vehicle roofs and vehicle hoods.

BACKGROUND OF THE INVENTION

The prior art has put forth several designs for vehicle sunroofs. Among these are:

U.S. Pat. No. 4,695,090 to David L. Draper describes an externally retractable sunroof assembly on a vehicle roof between side doors of the type having upper window frames that continue the contour of the roof. A roof opening in the outer roof panel has forward and rearward edges and has side edges exposing the interior of the roof side rails in which a pair of tracks are respectively mounted. A sunroof has side edges respectively mounted by the pair of tracks within the side rails and is movable between a closed position closing the roof opening and an externally retracted position above the outer roof panel to the rear of the roof opening. The sunroof has the side edges thereof in the closed position juxtaposed with respect to the upper window frames of the side doors to provide a continuous door to door appearance. In a preferred construction, the sunroof is made from metal or glass.

U.S. Pat. No. 4,995,665 to Hisao Ichinose, Yoshimitsu Takeda, Tsuyoshi Sato, Hiroshi Imai describes a sliding and tilting sunroof structure whose overall height is kept relatively small by using an actuating linkage with sliding front and rear guides with a pivoting link extending from each guide to the sunroof panel. A rear portion of the front link is additionally guided by a front portion of the rear guide.

U.S. Pat. No. 7,314,246 to Arthur L. MacNee, III and Christopher J. Dullivio describes a multi panel sunroof employing at least three movable sunroof panels. In another aspect of the present invention, three sunroof panels are stacked upon each other in one or two different operating positions. A further aspect of the present invention provides for rearward opening movement of a front sunroof panel and forward opening movement of a rear sunroof panel.

None of these prior art references describe the present invention.

SUMMARY OF THE INVENTION

It is an object of the present invention to provide an automated sunroof for vehicle hoods having three positions.

DETAILED DESCRIPTION OF THE INVENTION

Most inventions fill a relatively small need or perform a specialized and limited function, but if that need is shared by a sufficient number of consumers, the invention may have a great potential for success. Many automobile owners enjoy customizing their automobiles. Since such a large percentage of the population spends almost as much time behind the wheel as they do at home, it stands to reason that so many car owners want their vehicles to reflect as much personal style as a meticulously decorated house. Whether by ordering personalized license plates, attaching fancy mud flaps to the rear tires, installing floating neon lights along the car's undercarriage, airbrushing elaborate designs upon the car's hood and trunk, or bedecking tires with chrome based spinning rims, customizing one's vehicle is truly an exciting and artistic way in which to express oneself.

The present invention, hereinafter referred to as the 3 Stage Hood Roof, is a specially designed automated sunroof or hoodroof installed onto the hood of a vehicle. The invention provides auto enthusiasts a unique enhancement that is both practical and aesthetically unique. The 3 Stage Hood Roof is essentially rectangular in shape measuring approximately thirty one and one half inches in length, eighteen and one half inches in width, and one and one half inches in depth. Largely fabricated of durable vehicle grade glass, or any suitable transparent material such as polymethylmethacrylate such as Plexi-Glass™, or other plastic, for example, the roof can be transparent, tinted, translucent or opaque.

The 3 Stage Hood Roof is centrally positioned on a vehicle's hood and custom crafted into an appropriately sized hole protected with rubberized molding and silicone glue. The 3 Stage Hood Roof is connected to an internal motor that operates with a push button mechanism located within the car. Pressing the push button engages the motor to position the 3 Stage Hood Roof in three positions and a closed position.

Figure 2:
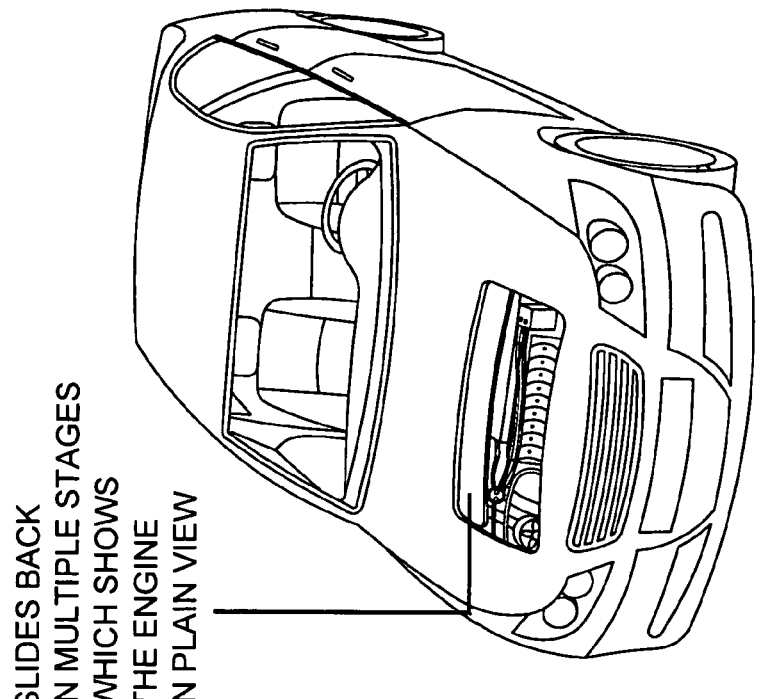
FIG. 2 is an illustrative diagonal front view showing an installed sunroof sliding back to show an engine in plain view.
Figure 1:
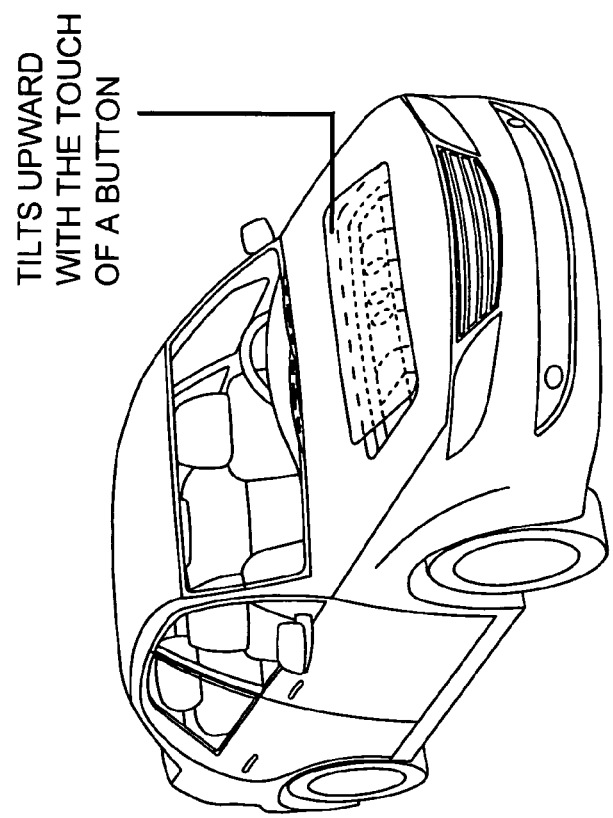
FIG. 1 is an illustrative diagonal front view showing an installed sunroof tilted slightly up.
Figure 4:
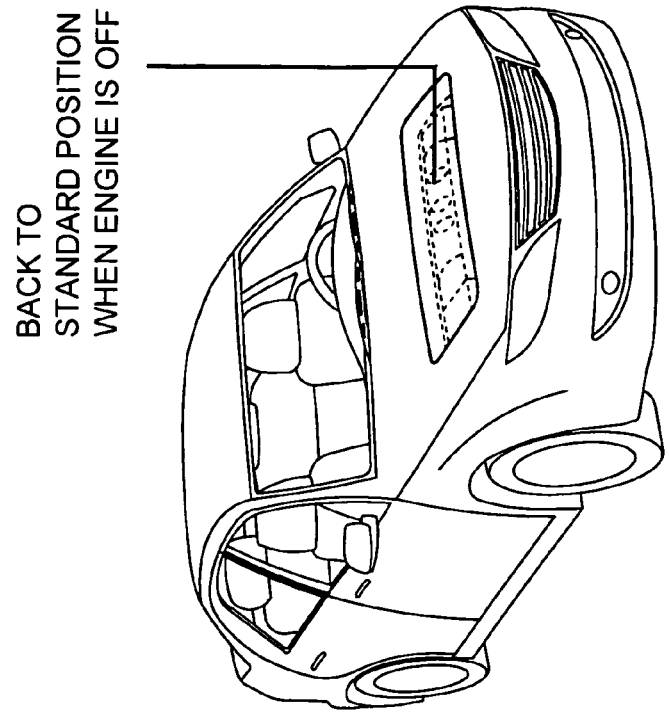
FIG. 4 is an illustrative diagonal front view showing an installed sunroof reverted back to its standard position when the engine is turned off.
Figure 3:
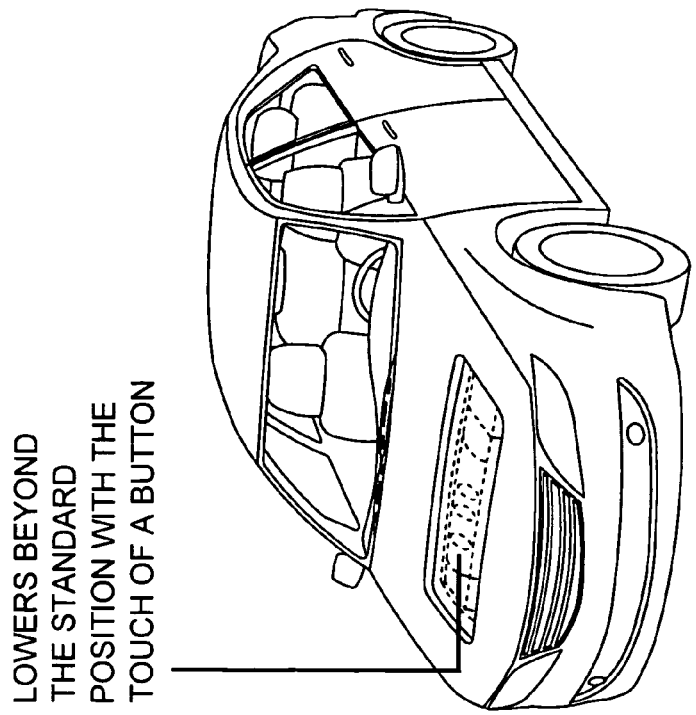
FIG. 3 is an illustrative front view showing an installed sunroof lowered beneath its standard position to allow air flow.

In the first position, the hoodroof rotates slightly from its front attachment to the roof and tilts upward toward the rear, as shown in FIG. 1. The second stage, shown in FIG. 2, completely retracts the roof, exposing the engine, thus enhancing the flow of air to the engine. This retraction can take place in multiple stages, exposing the entire engine, or only a portion, if desired. Second, the 3 Stage Hood Roof may be lowered beyond the standard position. The third stage, shown in FIG. 3, lowers the entire roof so that the roof is recessed from the hood of the vehicle. A fourth stage, shown in FIG. 4, shows the roof in the closed position, covering the entire engine.

A user is able to achieve the perfect position in a matter of seconds. Additionally, an automated system conveniently closes the 3 Stage Hood Roof to its standard closed position, shown in FIG. 4, when the car's engine is shut off. The present invention is an aftermarket product to be installed on existing vehicles, but it also is easily implementable into automobile designs at point of manufacture.

The 3 Stage Hood Roof turns an ordinary automobile into a dazzling showpiece. Providing automobile enthusiasts with a striking and attractive means of improving the appearance of their cars, the 3 Stage Hood Roof provides auto aficionados who collect vintage classics or enjoy restoring newer cars with an accessory that turns heads and catches impressed eyes, whether one is driving down the street or proudly displaying the vehicle in a local car show. As many car enthusiasts feel that the engine is the heart of the automobile, the present invention permits an unimpeded view of the car's primary component, an engine which is a work of art in and of itself. In addition to its aesthetic appeal, the 3 Stage Hood Roof offers a practical advantage. Exposing the engine to fresh air at the touch of the button, the present invention helps keep the engine cool, which prolongs an engine's life and helps significantly reduce gas mileage. Fashioned of durable high quality materials and components, the 3 Stage Hood Roof withstands years of continued use and enjoyment.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. An automated hoodroof installed on a hood of a vehicle, comprising: an essentially rectangular shape roof centrally positioned on the hood of a vehicle, wherein the roof is connected to an internal motor that operates with a push button mechanism located within the vehicle, and wherein pressing the push button activates the motor to move the roof into three positions and a closed position wherein:

the first position rotates the roof from its front attachment to the vehicle and tilts a rear end of the roof upward toward a rear of the vehicle;

the second position retracts the roof, exposing an engine, wherein the retraction can take place in multiple stages, exposing the entire engine, or only a portion of the engine;

the third position lowers the roof so that the roof is recessed from the hood of the vehicle;

the closed position covers the engine.

2. The hoodroof of claim 1 comprising durable vehicle grade glass, polymethylmethacrylate or other plastic.

3. The hoodroof of claim 2, wherein the durable vehicle grade glass, polymethylmethacrylate, or other plastic is transparent, tinted, translucent or opaque.

4. The hoodroof of claim 1, wherein the hoodroof measures approximately thirty one and one half inches in length, eighteen and one half inches in width, and one and one half inches in depth.

5. The hoodroof of claim 1 wherein the hood of the vehicle is custom crafted into an appropriately sized hole protected with rubberized molding and silicone glue to receive the hoodroof.

* * * * *